H. CHRISTIANSEN & J. P. GUPPEY.
CAN SEALING MACHINE.
APPLICATION FILED OCT. 23, 1913.
1,207,371.
Patented Dec. 5, 1916.
7 SHEETS—SHEET 1.
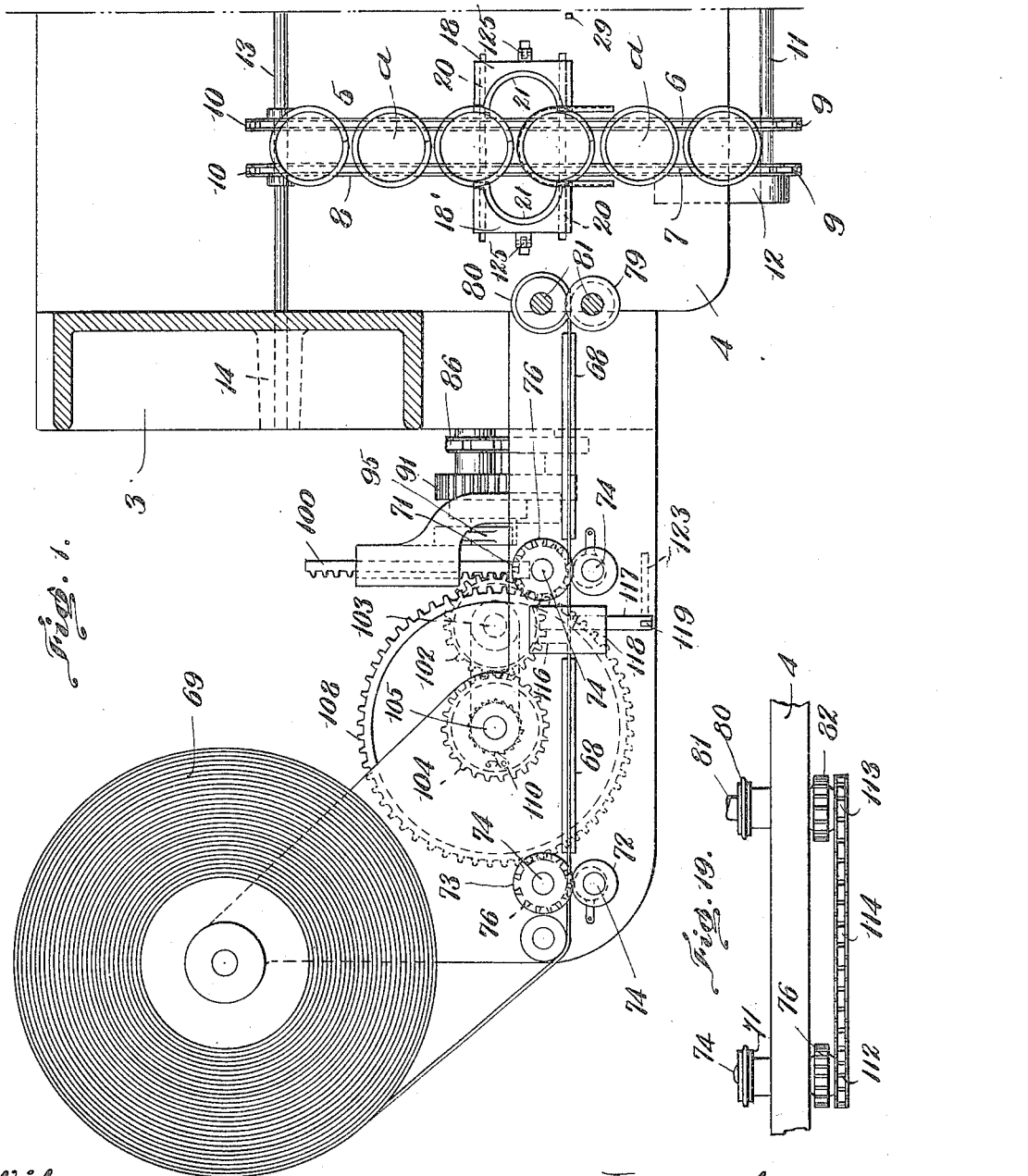

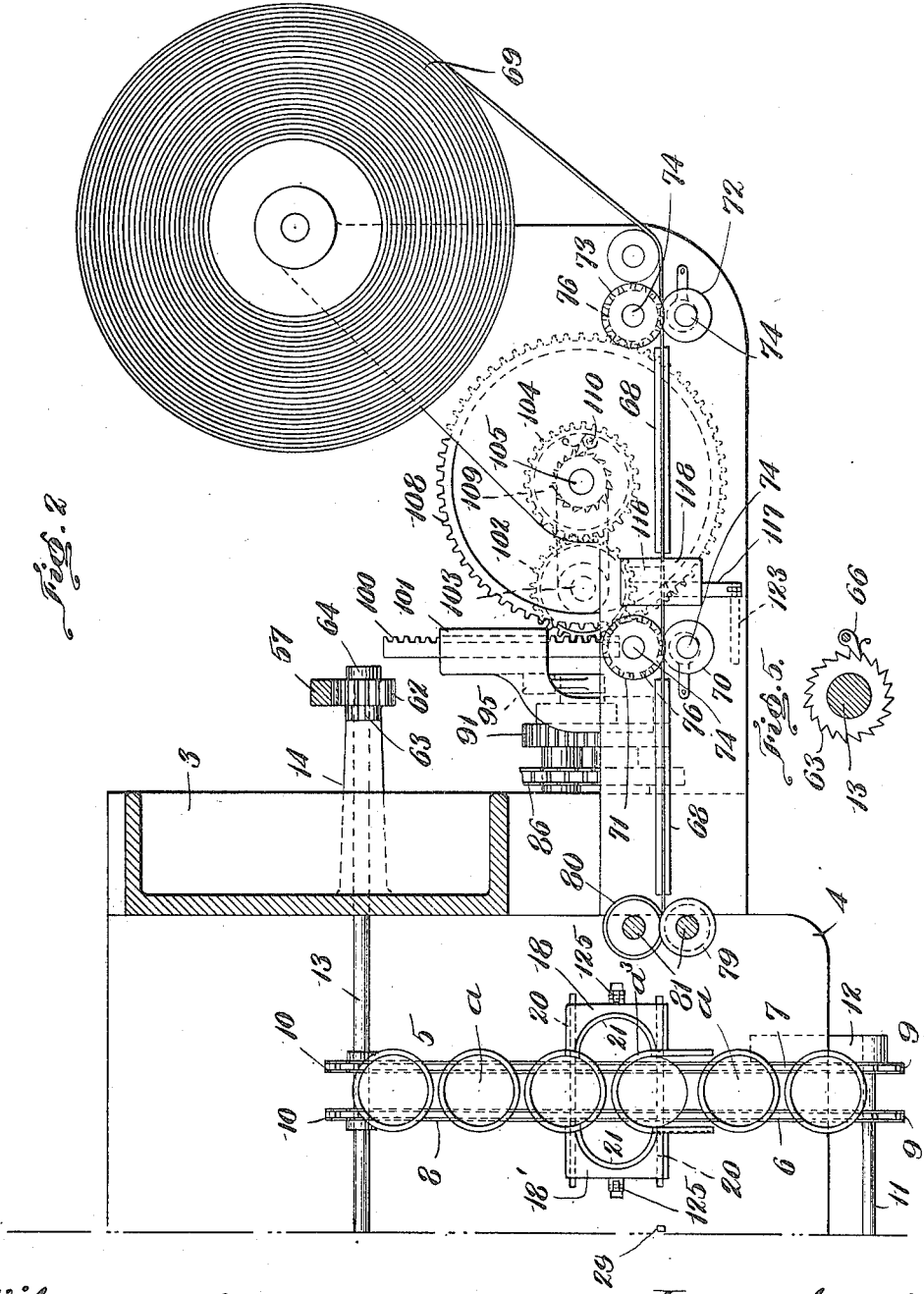

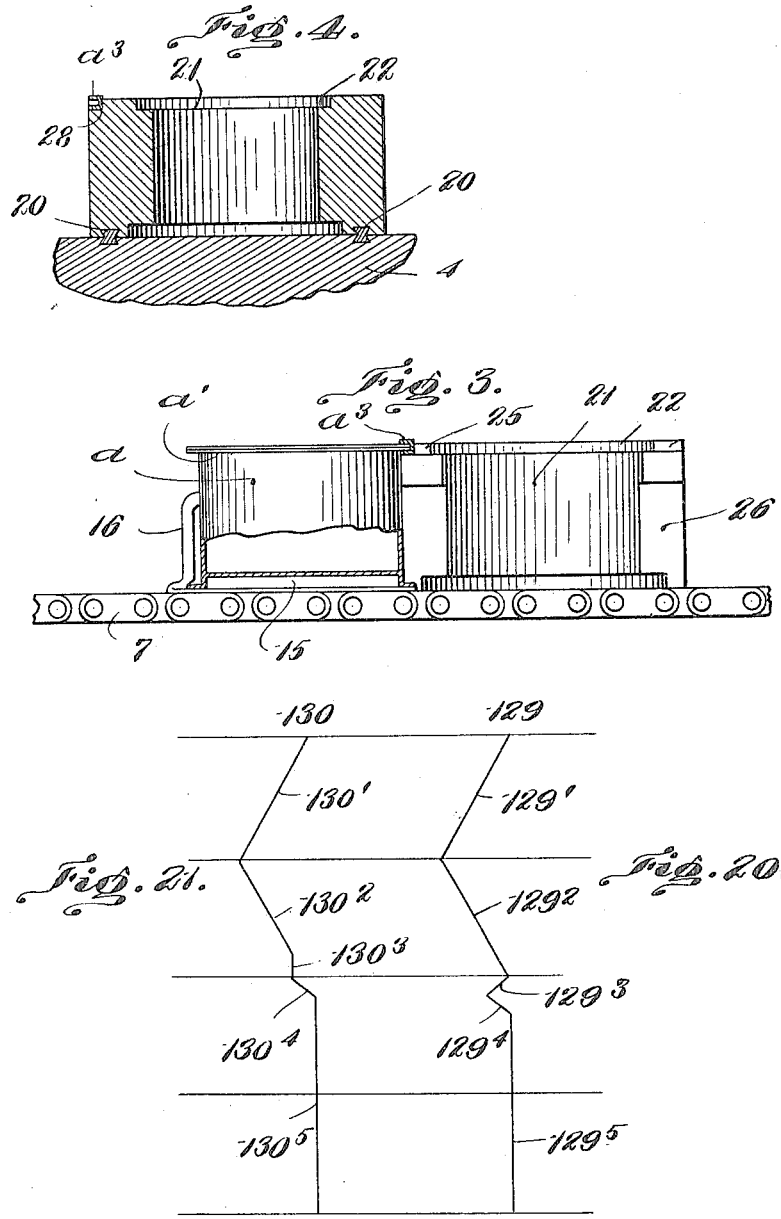

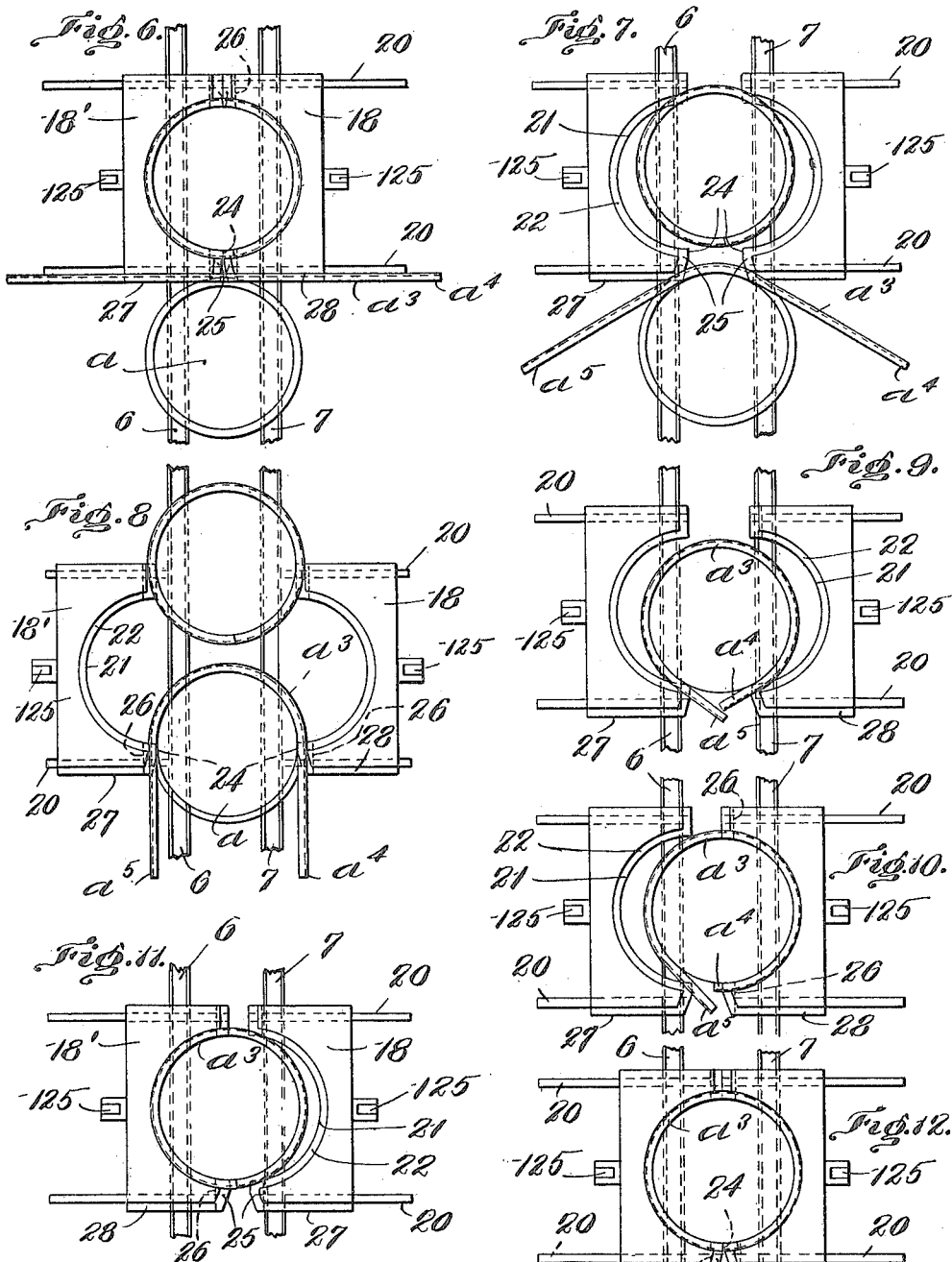

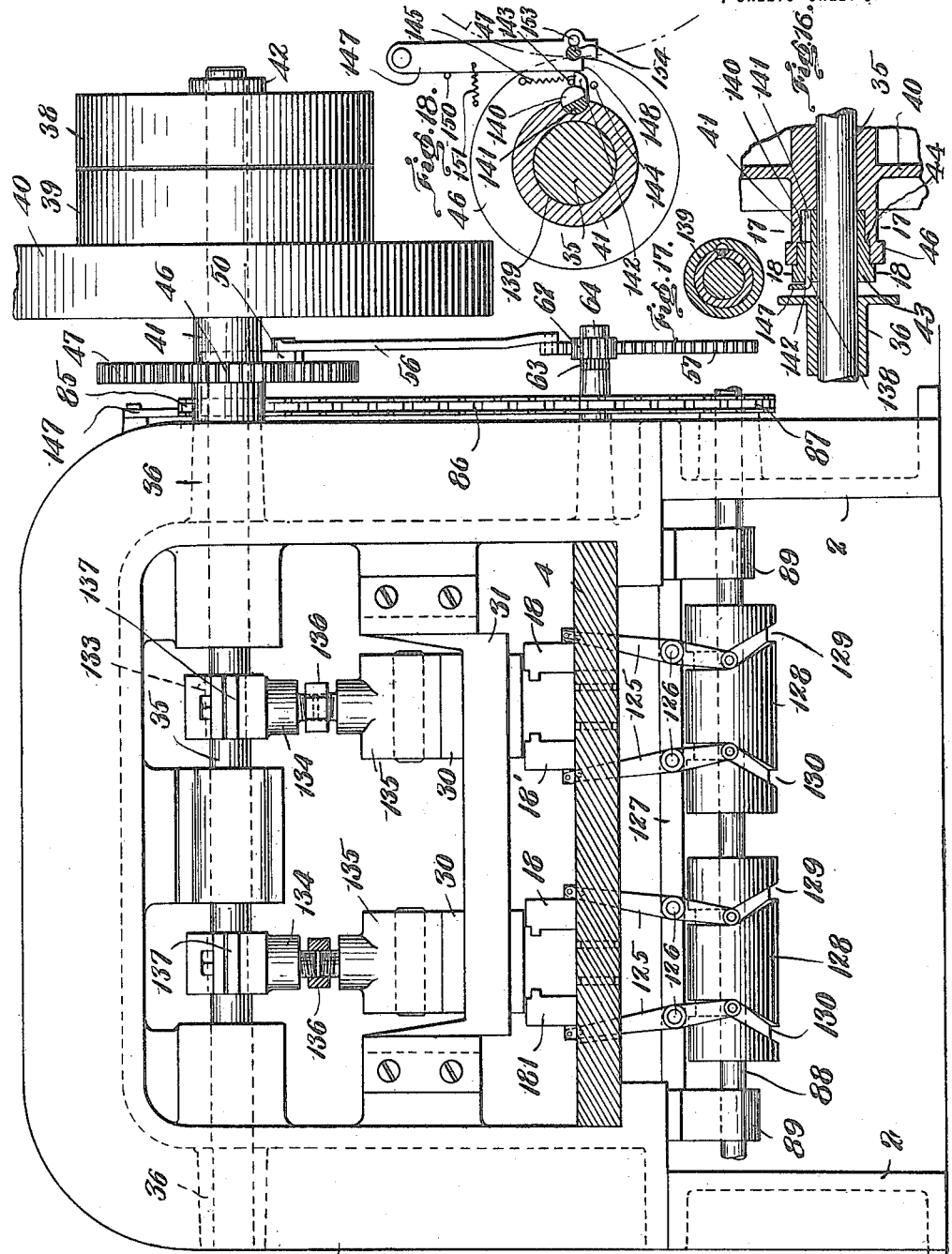

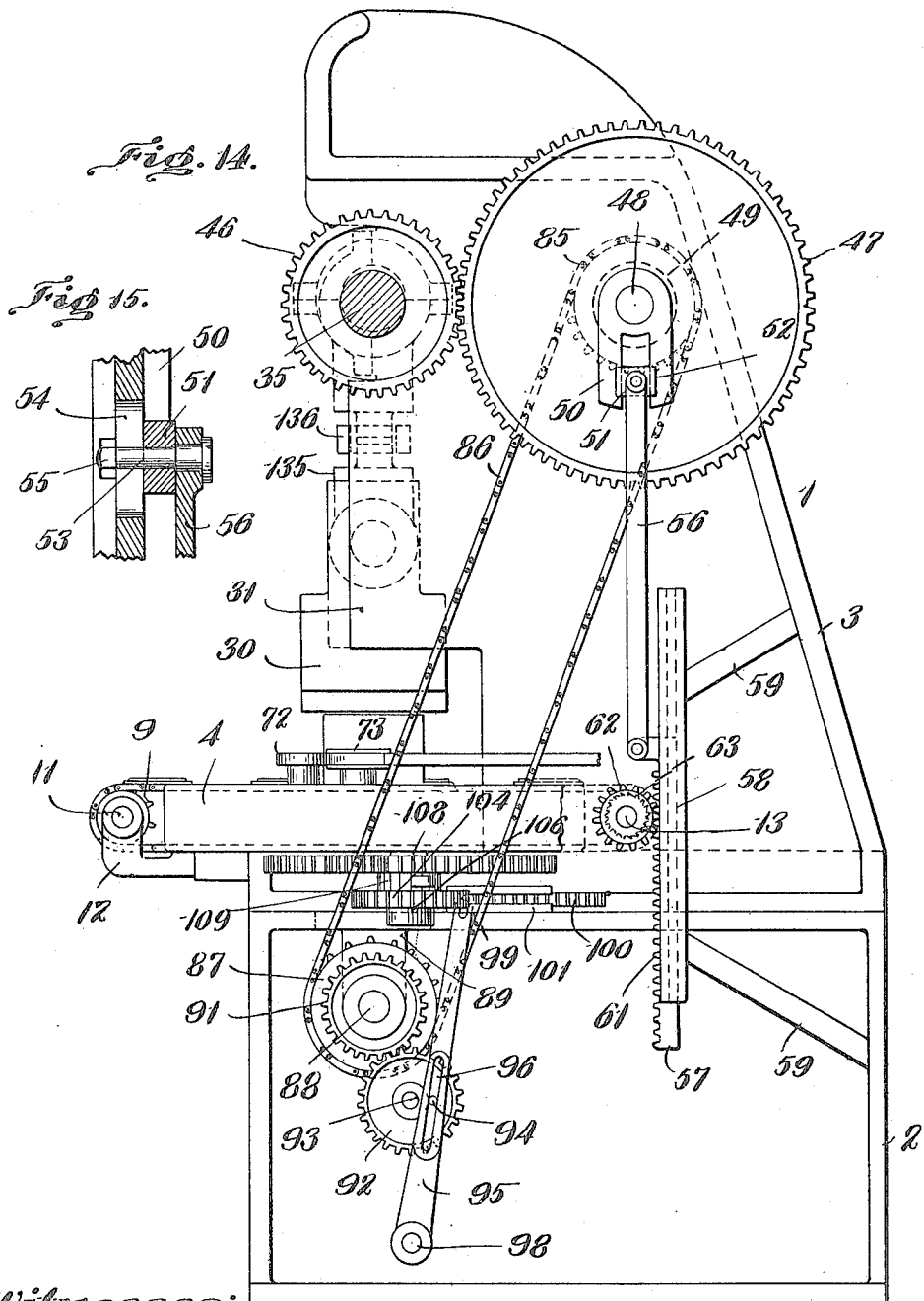

H. CHRISTIANSEN & J. P. GUPPEY.
CAN SEALING MACHINE.
APPLICATION FILED OCT. 23, 1913.
1,207,371.
Patented Dec. 5, 1916.
7 SHEETS—SHEET 7.
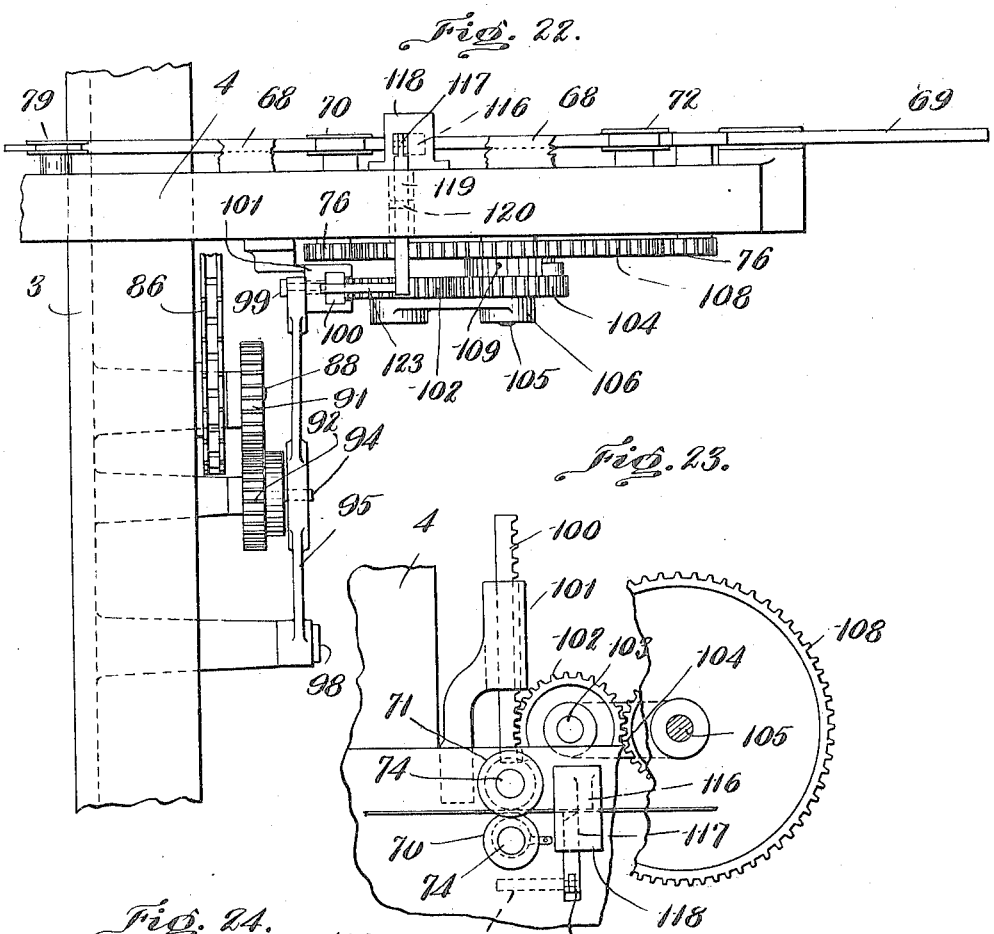

UNITED STATES PATENT OFFICE.

HANS CHRISTIANSEN, OF BEDFORD, AND JOHN P. GUPPEY, OF BOSTON, MASSACHUSETTS, ASSIGNORS, BY MESNE ASSIGNMENTS, TO THE BOWERS CAN SEAL COMPANY, OF BOSTON, MASSACHUSETTS, A CORPORATION OF MASSACHUSETTS.

CAN-SEALING MACHINE.

1,207,371.     Specification of Letters Patent.     Patented Dec. 5, 1916.

Application filed October 23, 1913. Serial No. 796,962.

*To all whom it may concern:*

Be it known that we, HANS CHRISTIANSEN, of Bedford, in the county of Middlesex and State of Massachusetts, and JOHN P. GUPPEY, of Boston, in the county of Suffolk, in said State, both citizens of the United States, have invented a new and useful Improvement in Can-Sealing Machines, of which the following is a full, clear, and exact description, reference being had to the accompanying drawings, forming a part of this specification, in explaining its nature.

The present invention relates to a can sealing machine operating to apply a sealing strip to a can body and cover which present laterally-projecting edges overlapping one another and to which the sealing strip is applied for binding these edges together and thereby hermetically sealing the can. Such type of can is shown in Letters Patent of the United States issued to John C. Bowers October 1, 1907, No. 867,239, and it is to the sealing of a can of this type that the present invention essentially pertains.

The special object of our invention is to provide a machine that will not only securely apply the strip to the overlapping edges of the can and cover, but will accomplish this effect with rapidity so that a large number of cans may be sealed within a relatively short time, which is a consideration of the utmost importance.

The machine embodying our invention can best be seen and understood by reference to the drawings, in which—

Figures 1 and 2 represent a plan of the machine. In this connection it should be understood that the machine shown is a twin machine consisting of duplicate parts operated from a single source of power. It is accordingly for the purpose of expediency that the complete machine is shown in two separate figures. Fig. 3 is a side elevation of a portion of the carrier and parts coöperating therewith for bending and applying the strip. Fig. 4 is a side elevation of one of the die members or those which assist in holding the strip and applying the same as will later be explained. Fig. 5 is a detail of construction forming part of the mechanism shown in Figs. 1 and 2. Figs. 6 to 12, inclusive, are plans of a portion of the carrier for the cans together with other coöperating parts and are for the purpose of illustrating the manner in which the strip is initially applied to the can. Fig. 13 is a front elevation of a portion of the operating mechanism of the machine. Fig. 14 is a side elevation of a portion of the operating mechanism of the machine. Fig. 15 is a view mainly in vertical section of a detail of construction shown in Fig. 14. Fig. 16 is a longitudinal vertical section of a clutch arrangement to which especial reference will later be made. Fig. 17 is a cross section on line 17—17 of Fig. 16. Fig. 18 is a cross section on the line 18—18 of Fig. 16. Fig. 19 is a view in side elevation of a detail of construction forming a part of the strip feeding and forming mechanism to which reference will later be made. Figs. 20 and 21 are diagrammatic views of a cam arrangement which assists in the operation of the machine as will later be explained. Fig. 22 is a front elevation of a portion of the mechanism shown in Fig. 14. Fig. 23 is a plan of a portion of the mechanism shown in Fig. 22. Fig. 24 is a plan in detail of a cutting mechanism, otherwise shown in Figs. 22 and 23. Fig. 25 is a side elevation of a can to the sealing of which the present machine essentially pertains. Fig. 26 is a section of the can shown in Fig. 25, the view being a diagrammatic one showing the body of the can, cover and sealing strip as dissociated parts.

Referring to the drawings:—In Figs. 25 and 26 a can is shown to the sealing of which the present machine essentially pertains and of which $a$ represents the body of the can having an upper flanged edge $a^1$. $a^2$ is the cover of the can which it will be observed is of sufficient width to overlap the flanged edge of the body thereof and rest thereon. $a^3$ is the sealing strip which is to be applied to the flanged edge of the body of the can and cover for binding them together and hermetically sealing the can. For convenience, the combined flanged body of the can and cover resting thereon will be hereinafter described as a whole or unit, the flanged edge of the body of the can and edge of the cover resting thereon being referred to simply as a flanged edge, such expression including those parts which are to be bound together by the sealing strip. 1 represents the body or main supporting structure of the machine, comprising a base piece 2, a frame 3 and table 4. As will be seen, the frame 3 is extended to rise above the table of the machine and bears a part of the operating mechanism, other parts being secured to the table and other parts mounted upon the base.

In describing the various mechanisms, reference will first be made to that mechanism which carries the cans and during the operation or travel of which the sealing strips are applied to the cans. This mechanism consists of endless carriers 5 which pass over and around the table. Each of these carriers comprises a pair of sprocket chains 6 and 7, respectively. In their passage over the table these chains run in grooves 8 formed in the top of the table. The depth of these grooves is such that the chains will pass just below the face of the table. The chains pass around the table by extension over sprocket wheels 9 and 10, respectively. The sprocket wheels 9 are fixed to an idler shaft 11 turning within bearings 12 fixed to the forward edge of the table. The sprocket wheels 10 are fixed to a shaft 13 which turns within bearings 14 at the rear edge of the table. The shaft 13 is a power-driven shaft and through it and the sprocket wheels 10 power is applied to the respective carriers by which the same are operated to pass over and around the table.

The cans are held to be borne by the carriers by resting upon circular plates or disks 15, which are secured to the opposite links of the respective chains and are of a size to fit within the recesses left in the bottoms of the cans as shown in Fig. 3. The cans also are supported against displacement during the movement of the carriers by fingers 16 which are secured to the rear edges of the plates 15 on which the cans are resting and which extend upwardly to bear against the rear sides of the bodies of the cans. The travel of the carriers and cans is a progressive and intermittent one, consisting of determinate steps of movement and dwells.

Before describing the operating parts of the machine in detail reference will first be made to the manner in which the sealing strip is applied to the can and to the parts which bear directly upon such application. One set only of these parts, or those coöperating with one carrier, will be referred to as the other set coöperating with the other carrier is an exact duplicate. 18, 18' are opposing members of a die arranged upon the table just outside the chains 6 and 7 and alongside the same. The members are supported to have an open and closed position with relation to one another and for this purpose are mounted upon guides 20 which are fixed to the table and laid to extend at right angles to the line of travel of the carrier. The form of these dies is as follows: On their interior sides or faces each die member is provided with a concavity substantially equal to one half of the body of the can, the combined members when closed engaging the entire body of the can beneath the flanged edge thereof. Provision is made for the overlap of this edge and the sealing strip applied thereto by an offset 21 cut in the heads of the respective die members (see Fig. 4) and providing an edge 22 against which the flanged edge of the can and sealing strip bears.

The die members are permitted to open a distance which only permits of the passage of the can between them as it is fed by the chain to enter the chamber of the die or fed out of the same. In this connection special attention is directed to the inside edges 24 of the respective die members, or those edges by which the can passes as it enters the chamber of the die. These edges are each provided with a groove 25 through which the flanged edge of the can and sealing strip applied thereto are adapted to pass as the can enters the die and by means of which the die members assist in applying the sealing strip to the can, as will later be explained. The respective edges 24 of the die members are also cut in below the grooved portions thereof by incisions 26 to leave an opening of sufficient size to contain the finger 16 when the die is in a closed position engaging the can. The front sides or faces 27 of the respective die members are also provided with horizontal grooves 28 therein. These grooves lie in the same plane as the flanged edge of the can when borne by the carrier. They are adapted to contain the U-shaped sealing strip $a^3$ extended to lie therein, the back portion of the sealing strip within the grooves 28 of the respective die members, with the forward flanged edge of the can contained to lie within the groove of the sealing strip, the can accordingly together with the two die members forming bearings for holding the strip in place. When thus held, the sealing strip is centrally disposed with relation to the can. In other words, the center of the strip is coincident with the diametrical center of the can at the point against which it is bearing and which is also at the longitudinal center of the carrier. This position of the strip is defined by a stop 29 fixed to the table, and against which the end of the strip bears.

Coöperating with the respective die members is a press having a plunger or head 30. This head is arranged, as will later be explained, to pass through a cross-head 31 fixed to the table of the machine over the die and acting as a guide for the plunger. The adaptation of these parts is also such that the plunger will enter the die when closed and coöperate with the incised edge or edges 22 of the closed die members for assisting in the application of the sealing strip $a^3$ to the flanged edge of the can.

The operation of these parts for applying the sealing strip to a can is as follows: The initial position of the can, sealing strip and die members is that shown in Fig. 6 where it will be seen that the die members are in a closed position with the sealing strip contained within the grooved edge or edges 28 of the die, with the forward flanged edge of the can bearing against the same as aforesaid. Assuming now that the carrier and can are moved forward a single step of movement. As the can is moved forward against the sealing strip the respective die members open with a simultaneous outward movement permitting of the entry of the can between the edges 24 thereof. As the can enters between these edges it will tend to bend the strip around the flanged edge of the can substantially as shown in Fig. 7, and which comprises the initial application of the strip to the can. It will also be seen that as the can enters between the edges 24, the flanged edge of the can and sealing strip applied thereto will enter to pass through the grooves 25 in the edges 24. The die members open outwardly with a movement relatively corresponding with the forward movement of the can in order that the grooved edges 24 thereof may assist in applying the strip to the can by their bearing against the strip. To assist in this application these edges 24 are preferably made curved with an outward angular inclination in order that they may properly coöperate with the bent form of the strip during the time of its initial application to the body of the can or until the can has so far progressed that the strip has been applied to substantially one half of the can. This position of the can is shown in Fig. 8 and it will be seen also, by reference to this figure, that the die members have been moved to a full open position. As the forward movement of the can continues the rear diametrical half thereof will then enter to pass between the grooved drawing edges 24 of the respective die members. Thereupon the die members will move inwardly with a simultaneous movement relatively corresponding with the movement of the can in order that the edges 24 of the die members may bear against the sealing strip and wrap the same around the rear flanged edge of the can, which movement continues until the parts have assumed a position substantially as shown in Fig. 9 and where it will be seen that the can has almost reached the diametrical center of the die and the die members are approaching a closed position. The application of the sealing strip is also nearly completed. Provision is now made for the overlapping of the sealing strip, for it will be understood that the ends of the strip when applied to the can overlap one another slightly or just enough to secure a tight joint. The movement of the can and carrier still continues until the can has reached a position at the diametrical center of the die. During this movement of the can the die member 18 controlling the underlapping portion $a^4$ of the strip, moves inwardly with the can for applying the end $a^4$ of the strip thereto, and the movement thereof continues until the can has reached the center of the die. The end $a^4$ of the strip has then become fully applied to the can and the parts have assumed a position substantially as shown in Fig. 10. The die member 18 will then have a slight reverse movement and at the same time the die member 18' will be moved inwardly to the limit of its closed position when it will operate to apply the end $a^5$ of the sealing strip to the flanged edge of the can, which completes the initial operation of applying the strip to the can, the parts then assuming a position substantially as shown in Fig. 11. Following this movement of the die member 18', the die member 18 will be moved again inwardly to a closed position, when both die members will engage the body of the can, as shown in Fig. 12 with the flanged edge of the can and sealing strip applied thereto overlapping and resting upon the edges 22 of the respective die members, which provide an annular bearing therefor. Following this movement, the plunger 30 of the press will move downwardly into contact with the sealing strip and flanged edge of the can and pinch the sealing strip between the head and the edge 22 of the die members and thereby compressing it onto the flange of the can hermetically sealing the can. Following this pinching operation the operation of the machine reverses the plunger or head. Thereupon the feed of the carrier and can or cans carried by it is continued another step. Simultaneously with such movement the die members 18, 18' open, permitting of the forward passage of the can to which the strip has been applied from between the same as another can is moved forward to enter between the die members and the sealing strip becomes applied thereto with the precise operation above explained.

The parts of the machine thus far referred to have been those parts which act directly upon the can for applying the sealing strip thereto. These parts have been described not only in the light of their construction but also of their operation in order that a proper understanding may be had of the mechanisms controlling not only these parts but also the sealing strips for forming and feeding it into proper position preparatory to its initial application to the cans. Moreover, each step of movement of the carrier and cans borne by it is availed of to effect certain operations, each dwell to effect other operations. In other words, each period of dwell is availed of to effect the following operations: forming the sealing strips and feeding them into a position just forward of a can and the respective die members whereby the strip may be wrapped around the can as the can is moved forward during the next step of movement. Each period of dwell is also availed of to complete the final operation of the die members and to also operate the press.

During each step of movement not only are the carriers operated to carry the cans, but the die members are also operated to apply the sealing strip thereto as outlined above, the entire mechanism for operating all the parts deriving its power from a single source of application.

Reference will first be made to the manner in which power is applied for moving the carriers and cans by successive steps with intermediate periods of dwell. 35 is a shaft which turns in bearings 36 arranged on the frame of the machine above the table. The shaft 35 lies above the respective carriers and extends at right angles to the respective lines of their travel. It lies also directly above the respective sets of die members 18, 18'. Loosely mounted upon the shaft is an idler pulley 38 and also a driven pulley 39 fixed to a fly wheel 40 having a projecting hub 41. The respective pulleys and fly wheel are held against longitudinal displacement on the shaft by a collar 42 on the outer end of the shaft and also by a sleeve 43 keyed to the shaft and presenting a shoulder 44 against which the end of the fly wheel bears (see Fig. 16). Fixed to the hub 41 of the fly wheel is a gear 46 having toothed engagement with a gear 47 fixed to a shaft 48 which turns within bearings 49 secured to the frame of the machine. Carried by the gear 47 is a crank 50. This crank is in the nature of a yoke presenting arms in which is mounted a block 51 adjustable within the arms of the crank in a radial direction toward or away from the axis of the gear 47. The adjustable retention of the block 51 is provided for as shown in Fig. 15 where it will be seen that the body of the block fitting between the arms of the crank is provided with edges 52 which have an overlapping bearing against the exterior faces of the respective arms. Extending through the block is a bolt 53 which extends also through a radial slot 54 cut in the body of the gear and is secured on the reverse side thereof by a nut 55 which tends to clamp the block against the arms of the crank, holding it securely in place in adjusted position within the limits defined by the slot in the gear.

Pivotally secured to the block or rather to the bolt 53 by which it is secured, is a link or arm 56. This arm at its outer end connects with the turned end of a rack bar 57 arranged to slide within a guide 58 supported by brackets 59 connecting with the frame and base portion of the machine. The disposition of the rack bar is such that the toothed edge 61 thereof will have engagement with a gear 62 loosely mounted upon the end of the shaft 13. Alongside the gear 62 on the same shaft is a ratchet wheel 63 fixed to the shaft, the gear 62 lying between the ratchet wheel and a fixed collar 64 by which the gear 62 is held in place. Pivoted to the side of the gear 62 is a spring-pressed dog 66 adapted to engage the teeth of the ratchet wheel during the forward movement of the gear and to pass idly over the same during the reverse movement of the gear.

In the operation of these parts just described as the gear 47 is rotated from off the fly wheel it operates as a crank through the link 56 to reciprocate the rack bar 57, the bar being moved downwardly by a half revolution of the gear 47 and in a reverse direction during the remaining half revolution of the gear. During the downward movement of the rack bar motion is applied to the gear 62 and through the dog 66 thereon, to the ratchet wheel 63 and shaft 13 which tends to move the respective carriers and cans through a single step of movement. In other words, the arrangement of the parts is such that each forward step of the carriers is commensurate with a half revolution of the gear 47 as this gear is operated to impart a downward thrusting impulse to the rack bar 57. During the remaining half revolution of the gear 47 and upward throw of the rack bar no motion will be imparted to the shaft 13. Consequently the movement of the carriers ceases providing a dwell until the next half revolution of the gear 47 imparts a further downward movement to the rack bar, when the carriers are moved though another step of movement, followed by a dwell as the rotation of the gear continues.

Reference will now be made to the strip feeding and forming mechanism in which connection attention is first directed to the guideways 68 arranged to extend over the face of the table (see Figs. 1 and 2). The feed and forming mechanism will be described in the light of one of these guideways inasmuch as the mechanism is the same for both. The guideway is slotted to receive a flat main strip of metal which may be drawn from a coil 69 or otherwise fed to the machine. 70, 71; 72, 73 are the feed rolls, the engaging edges of which are adapted to receive the strip between them and to feed the same forward through the guide. These rolls are mounted upon shafts 74 which extend through the table, being suitably mounted to turn thereon. To the shaft of each of the respective feed rolls 71, 73 beneath the table, is fixed a gear 76 by which the respective sets of feed rolls may be positively driven. Beyond the feed rolls are combined feed and forming rolls 79, 80. Of these rolls, the roll 79 is provided with a substantially U-shaped groove, while the roll 80 has a corresponding curved peripheral edge which enters the groove in the roll 79, the two rolls, in other words, coöperating with one another to bend the strip fed between them and impart to it a substantial U shape in cross section which fits it for its initial application to the can. The rolls 79 and 80 are each mounted upon a shaft 81 which extends through the table with suitable bearings to turn therein. To the ends of the shafts 81 are fixed intermeshing gears 82 through which the rolls are driven, power being applied for operating the rolls, as will later be explained. It will also be seen that the rolls 79, 80 are located at the end of the guideway and in a position where the sealing strip $a^3$ fed by and between them may enter between the flanged edge of a can and the die members 18, 18' to lie within the groove 28 formed therein as aforesaid preparatory to its application to a can by the advance movement thereof on the carrier, according to the operation described above. During each dwell of the carriers and cans the feed rolls are positively driven to feed the main strip a distance precisely equal to the length of the sealing strip $a^3$, this depending of course upon the size of the can.

Between the two sets of feed rolls 70, 71; 72, 73 is located a cutting mechanism which operates to cut the main strip into proper lengths. The disposition and arrangement of the feed rolls and that of the combined feed and forming rolls in their relationship to one another and to the cutting mechanism and main strip are otherwise such that during each dwell of the carriers and cans and prior to the severance of the sealing strip, the main strip will be fed forward by the combined sets of feed rolls to a position where the forward end of the main strip will lie just back of the forming rolls 79, 80 and about to enter these rolls. The strip is then severed by the cutting mechanism which operates at the end of the feed movement and leaves a severed strip reaching from the jaws of the cutting mechanism to a point just back of the feed and forming rolls 79, 80, as aforesaid.

During the next period of dwell the combined sets of feed rolls will operate to feed the main strip a distance equal to the length of the severed strip or sealing strip $a^3$. The severed strip will at the same time, be advanced by the feed rolls 70, 71 which are located beyond the cutting mechanism, and fed into the combined feed and forming rolls. These rolls will then operate to feed the severed strip into the groove 28 of the respective die members whereby it may lie between these members and the forward edge of the can.

The proper endwise position of the strip is defined by the stop 29 against which the strip is fed out of the feed and forming rolls 79, 80. It will accordingly be seen that the combined feed and forming rolls at one end and the stop at the other end define the proper and precise endwise disposition of the sealing strip in its relation to the can, holding it, in other words, centrally disposed with relation thereto.

The combined sets of feed rolls 70, 71; 72, 73 are driven as follows: Fixed to the shaft 48 and turning in the same time as the gear 47 is a sprocket wheel 85. Connecting with this wheel is a sprocket chain 86 which connects with a sprocket wheel 87 fixed to a shaft 88 journaled to turn in hangers 89 fixed to the base portion of the machine, beneath the table. The shaft 88 bears upon its end fixed thereto a gear 91 (see Fig. 14). This gear meshes with a gear 92 mounted to turn idly upon a stud 93 fixed to the base structure of the machine. Projecting from the side of the gear 92 is a pin 94 which engages a slotted lever 95 by entering the slot 96 therein. This lever is pivoted to a stud 98 fixed to the base portion of the machine at a point below the gear 92 and projects upwardly some distance above this gear, the adaptation and arrangement of the parts being such that as the gear 92 is rotated it will operate as a crank to reciprocate the lever 95 with a forward and backward movement. At its upper end the lever 95 pivotally connects with a pin 99 on the end of a rack bar 100 for imparting a longitudinal forward and return movement thereto. This rack bar is horizontally disposed and mounted to slide within a bracket 101, fixed to the base structure of the machine. The toothed edge of this rack bar is in engagement with a gear 102 which is mounted to turn idly upon a stud 103 fixed to the under side of the table of the machine. The gear 102 has engagement with an idler gear 104 mounted upon a shaft or stud 105 fixed to and projecting from the under side of the table, the gear being held in place by a collar 106 upon the end of the shaft (see Fig. 22). Mounted idly upon the same shaft is a gear 108 having fixed to it a ratchet wheel 109 which lies between the gears 104 and 108 and like them turns idly upon the shaft 105. Pivoted to the side of the gear 104 is a spring-pressed pawl or dog 110 which engages the toothed edge of the ratchet wheel 109 for rotating this wheel and the gear 108 as the gear 104 is turned in one direction, or the pawl passes idly over the ratchet wheel as the gear 104 is turned in a reverse direction. The gear 108 is a relatively large gear, the toothed edges thereof engaging both of the gears 76 of the respective sets of feed rolls as the gear 108 is turned. The size, disposition and arrangement of the parts is also such that the gear 108 will be rotated for operating the feed rolls only during the upward half revolution of the gear 47, or, in other words, during that half revolution of the gear 47 when the crank thereon is imparting an upward drawing movement to the rack bar 57, which defines the dwell of the carriers and cans.

It will be observed that the sprocket wheels 85 and 87 are of the same size, the shafts 48 and 88 rotating in the same time. Accordingly, the gears 47 and 91 will have the same time period of revolution as has also the gear 92 which is driven by the gear 91, the two gears being of the same size. The gear 92 having therefore the same time revolution as the gear 47, will operate through the lever 95 to impart to the rack bar 100 a forward and reverse movement, which is exactly in time with a full revolution of the gear 47. The forward movement of the rack bar 100, when it is operating through the connecting mechanism to drive the feed rolls, is during that half revolution of the gear 47 when it is imparting no motion to the carriers and cans, or, in other words, during the dwell of the carriers and cans. The reverse movement of the rack bar 100, or return to its initial position, is during the other half revolution of the gear 47, or while it is operating to move the carriers and cans through a single step of movement, the rack bar 100 during this period imparting no movement through the connecting mechanism to the feed rolls.

The combined feed and forming rolls 79, 80 are operated simultaneously with the feed rolls 70, 71; 72, 73 and by the same mechanism that operates the feed rolls. Connection is made as follows: Arranged upon the end of the shaft 74 of the feed roll 71, beneath the table, is a sprocket wheel 112. Arranged also upon the end of the shaft 81 of the combined feed and forming roll 80 beneath the table, is a sprocket wheel 113. These sprocket wheels are connected by a sprocket chain 114. By means of these connections motion applied for operating the feed rolls will also operate the combined feed and forming rolls through the intermeshing gears 82 arranged upon the respective shafts 81 thereof, as aforesaid, all the sets of rolls being turned simultaneously and an equal amount.

According to the arrangement shown, the main strip is severed by the cutting mechanism after the feed. Provision is accordingly made whereby the cutting mechanism may be operated by the rack bar 100 at the end of its return stroke after the forward or feeding movement thereof.

The cutting mechanism comprises fixed and movable jaws 116, 117. These jaws are mounted upon a holder 118 fixed to the table of the machine and through which the strip is fed. Of these jaws the jaw 116 is fixed to the holder, the cutting edge thereof lying just adjacent one side of the strip. The movable jaw 117 projects through the holder on the other side of the strip and is slidably mounted therein whereby the cutting edge thereof may properly coöperate with the cutting edge of the jaw 116 as the jaw 117 is moved inwardly for severing the strip. Pivotally secured to the end of the jaw 117 is a lever 119 which extends through the table and is fulcrumed to a bracket 120 secured to the under side of the table. This lever is tensionally retained by a spring 121 whereby the jaw 117 controlled by it may occupy a normal operative position, or position where the cutting edge thereof will lie just adjacent the strip in position for severing it as the lever 119 is turned and the cutting jaw 117 moved inwardly across the line of the strip. A stop 122 defines the normal position of the lever 119 and against which it is held by the spring. Projecting from the end of the lever 119 is an arm 123 which lies within the path of the rack bar 100 whereby it may be struck by the end of the rack bar at the termination of its reverse movement, the lever 119 being turned thereby, which operates the jaw 117 to cut the strip.

Referring now to the mechanism for operating the members 18, 18' of the die, which members assist in applying the sealing strip to the can as aforesaid: Pivotally connecting with the rear ends of each of the members 18, 18' are cam levers 125. These levers extend downwardly through the table and are pivoted respectively at points 126 to a fixture 127 arranged below the table and above the shaft 88. The levers 125 are operated for imparting movement to the respective die members by means of a cam 128 having slots 129, 130 therein in which the ends of the respective levers are contained to slide. The cam 128 is borne by the shaft 88 to turn in the same time as the gear 47, and is accordingly continuously turning during the operation of the machine. A proper and precise movement is given to the die members 18, 18' by the form of the slots 129, 130 cut in the die. The general character of these slots is illustrated diagrammatically in Figs. 20 and 21 of which Fig. 20 shows the form of slots 129 in the cam which control the operation of the die members 18, while in Fig. 21 is illustrated the form of slots 130 which control the operation of the die members 18'. Both of the slots 129, 130 are those by which the cam 128 operates to control the movements and positions of the die members during a single revolution of the cam. Since the cam has the same time revolution as the gear 47, it will accordingly during a single revolution control the movements and positions of the die members during each step of movement of the carriers and cans and also during the dwell thereof following each step of movement.

Referring to Figs. 20 and 21, where is indicated the form of the respective slots 129, 130, the portions 129', 130' are those which enable the cam to impart an outward movement to the die members at the beginning of the feed and which continues until the respective members have been moved to a full open position, as shown in Fig. 8. $129^2$, $130^2$ are those portions of the slots which enable the cam to impart the succeeding inward movement to the die members and which continues until the cam has moved the die member 18 to a full closed position and the member 18' to one approaching a closed position as shown in Fig. 10 thus providing for the overlapping ends of the strip, the lag in the movement of the member 18' being provided for by the portion $130^3$ in the slot 130.

The movements of the die members thus far effected have been during that half revolution of the gear 47 and cam 128 when the gear 47 is operating to move the carriers and cans through a single step of movement, the portions of the slots thus far referred to accordingly occupying one half of the peripheral surface of the cam. The portions of the slots now to be mentioned are those occupying the other half of the peripheral surface of the cam and by which the cam controls the operation of the die members during the remaining half revolution of the gear 47, when it is imparting no movement to the carriers and cans, or during the dwell thereof. The portions $129^3$ and $130^4$ of the respective slots enable the cam to impart an outward movement to the die member 18 and an inward movement to the member 18' when the member 18' assumes a full closed position, both members then appearing as shown in Fig. 11. The combined portions $129^4$ and $129^5$ of the slot 129 and the portion $130^5$ of the slot 130 then enable the cam to move the die member 18 inwardly to a full closed position, both die members then being fully closed and engaging the can, in which position they remain during the operation of the press and until the gear 47 and cam have completed their revolution and the feeding operation of the carriers and cans again begins.

The press or presses which operate to pinch the sealing strip onto the flange of the can, are operated directly off the shaft 35. For this purpose the shaft 35 is bent or otherwise formed to provide cranks 133. Connecting with the shaft at the points of these cranks are crank arms 134 which connect with the plungers 30 of the respective presses through interposed link connections 135. The connections 135 are pivotally secured to the respective plungers in order to compensate for the motion of the crank. In order that the plungers may be adjusted with relation to their operating cranks the shaft 35 and connections 135 are adjustably secured to the respective crank arms 134 by means of adjusting nuts 136 which connect the respective arms and link connections by engaging right and left threads cut upon the adjacent ends of these parts.

As above described, the presses are operated only during the dwell of the carriers and cans after the sealing strip has been applied to the can and the die members have both been brought into engagement therewith. The presses are operated at this time by the rotation of the shaft 35. Provision is made for rotating this shaft directly from the fly wheel through a clutch engagement as follows: By reference to Fig. 16 it will be seen that the projecting hub 41 of the fly wheel partly overlaps the sleeve 43 fixed to the shaft 35. Carried by the sleeve 43 is a pin 138. This pin extends parallel with the shaft 35 and in the plane or line of the joint 139 between the hub and sleeve. The joint 139 is provided with a hole or socket 140 for receiving the end 141 of the pin which projects into the socket. The end 141 of the pin, however, which extends into the socket 140, is made semi-circular in cross section so that it may be contained wholly within the sleeve when the pin is turned into what may be termed an inoperative position. The hub of the fly wheel will then rotate idly within the sleeve and impart no motion to the shaft 35. When the pin is turned into what may be termed an engaging position the semi-circular end 141 thereof turning within its socket, will cross the line of the joint between the hub and sleeve and form a connecting link between these parts, and they will be connected to rotate in unison. In other words, when the pin is in its engaging position the shaft 35 will be rotated directly from off the fly wheel.

The pin 138 is controlled in the following manner: The end of the pin, it will be observed by reference to Fig. 16, projects beyond the outer end of the sleeve 43 and is provided with a turned end 142 forming a lever for turning the pin. The engaging and disengaging positions of the pin 138 are determined by the stops 143, 144, respectively, on the end of the sleeve. The pin is normally held in an engaging position against the stop 143 by a spring 145 connecting with the turned end 142 of the pin and secured to the end of the sleeve (see Fig. 18). Pivotally secured to the frame of the machine in a position adjacent the turned end of the pin, is a lever 147. This lever is provided with a shoulder or edge 148. The disposition and arrangement of the lever are such that as the shaft 35 is rotated (assuming the parts to be in clutch engagement with one another) the turned end 142 of the pin will engage the shoulder 148 on the lever and be turned thereby against the tension of the spring 145 into an inoperative position, thereby releasing the clutch. Such position is defined by a stop 150 located beneath the lever and fixed to the frame of the machine. The lever is held yieldingly against this stop in its normal operative position by means of a spring 151 connecting with the frame of the machine.

Projecting from the side of the lever 147 is a stud 153. Projecting also from the side of the gear 47 adjacent the peripheral edge thereof, is a stud 154. The disposition and arrangement of these respective studs are such that as the gear 47 is rotated, the stud 154 carried by it will engage the stud 153 on the lever to pass under the same and thereby lift the lever into a disengaging position. The shoulder 148 on the lever will then no longer bear against the turned end 142 of the pin 138 and the pin will be drawn by the spring 145 into engaging position, making clutch engagement between the hub 41 of the fly wheel and the shaft 35.

The disposition of the stud 154 on the gear 47 is such that this stud will engage the stud 153 on the lever 147 and raise this lever into a disengaging position for throwing in the clutch precisely at the completion of that half revolution of the gear 47 when it is operating to throw down the rack bar 57 and move the carriers and cans through a single step, or, in other words, at the commencement of that half revolution of the gear 47 which defines the dwell of the carriers and cans. Moreover, the clutch engagement will continue during only a single revolution of the shaft 35, for after the stud 154 upon the gear 47 has passed from beneath the stud 153 on the lever 147 the lever will return to its normal engaging position and accordingly will engage the turned end 142 of the pin 138 at the completion of a single rotation of the shaft 35, thereby throwing the pin into a disengaging position and releasing the clutch.

The complete rotation of the shaft 35 is commensurate with a half revolution of the gear 47. The reason for this is that the gear 46 which rotates in the same time as the fly wheel and shaft 35 and from off which the gear 47 is rotated, has a ratio of 2:1 with respect to the gear 47. It will accordingly be seen that the rotation of the shaft 35 and operation of the presses will be completed within that half revolution of the gear 47 when it is imparting no movement to feed the carriers and cans, or during the dwell thereof.

It will further be understood that in the operation of the machine the cans to be sealed with covers thereon are successively placed upon the carriers, either by hand or otherwise, to be fed forward by the carriers and the sealing strips applied thereto. After the application of the strips the cans are borne forward by the carriers and fall therefrom into any suitable chute or receptacle (not shown) as the carriers turn downwardly around the rear edge of the table.

It is apparent that the construction of the machine hereinbefore described may be varied without departing from the essential principles involved.

What we claim as our invention is:—

1. A can sealing machine for applying a sealing strip to the laterally-projecting and overlapping edges of a can body and cover, the same comprising a carrier for the cans having a progressive movement, movable strip holding members between which the can passes as it is borne by said carrier during the advance movement thereof whereby a strip held by said members in the path of said laterally-projecting and overlapping edges of the can body and cover may become bent and applied to said overlapping edges around a portion of said can during the advance movement thereof on said carrier, and means for operating said members to engage and assist in the bending of said strip and complete the wrapping thereof around said overlapping edges.

2. A can sealing machine for applying a sealing strip to the laterally-projecting and overlapping edges of a can body and cover, the same comprising a carrier for the cans having a progressive movement, movable strip holding members between which the can passes as it is borne by said carrier during the advance movement thereof whereby a strip held by said members in the path of said laterally-projecting and overlapping edges of the can body and cover may become bent and applied to said overlapping edges around a portion of said can during the advance movement thereof on said carrier, and means for producing a relative progressive movement between said carrier and strip holding members, whereby said can may be moved to pass between said members and said members follow around the overlapping edges of said can body and cover and assist in the application of the strip thereto as the can is borne by the carrier to pass between the members.

3. A can sealing machine for applying a sealing strip to the laterally-projecting and overlapping edges of a can body and cover, the same comprising a carrier for the cans having a progressive movement with intermittent periods of dwell, movable strip holding members oppositely arranged and between which the can passes as it is borne by said carrier during the advance movement thereof whereby a strip held by said members in the path of the laterally-projecting and overlapping edges of the can body and cover may become bent by the operation of said members and applied to said overlapping edges around a portion of said can during the advance movement of said carrier, and means for relatively operating said carrier and strip holding members whereby a can may be borne to pass between said members and the sealing strip bent and applied to said overlapping edges around a portion thereof by the operation of said members during the advance movement of the carrier, and said members complete their operation for applying the sealing strip to the can during the following dwell of the carrier.

4. A can sealing machine for applying a sealing strip to the laterally projecting and overlapping edges of a can body and cover, the same comprising a carrier for the cans having a progressive movement with intermittent periods of dwell, movable strip holding members oppositely arranged and between which the can passes as it is borne by said carrier during the advance movement thereof whereby a strip held by said members in the path of said laterally-projecting and overlapping edges of the can body and cover may become bent by the advance movement of the can and applied by the operation of said members to said overlapping edges around a portion of the can during the advance movement of the carrier, and means for producing a relative movement between said carrier and strip holding members whereby said can may be moved to pass between said members for bending said strip and said members follow around said overlapping edges for applying the sealing strip thereto around a portion of the can during the advance movement of the carrier, and said members complete their operation of applying the sealing strip to said overlapping edges during the following dwell of the carrier.

5. A can sealing machine for applying a sealing strip to the laterally-projecting and overlapping edges of a can body and cover, the same comprising a carrier for the cans having a progressive movement with intermittent periods of dwell, movable strip holding members between which the can passes as it is borne by said carrier during the advance movement thereof whereby a strip held by said members in the path of said laterally-projecting and overlapping edges of the can body and cover may become bent by the advance movement of the can and applied to said overlapping edges around a portion of the can by the operation of said members during the advance movement of said carrier, and means for obtaining a relative movement between said carrier and members whereby said carrier may be moved to carry the can between said members and said members be simultaneously operated to engage said sealing strip and follow around said overlapping edges for applying the sealing strip thereto around a portion of the can during the advance movement of the carrier and said members then operate with a variable movement during the following dwell of the carrier for applying the ends of the sealing strip to said overlapping edges.

6. A can sealing machine for applying a sealing strip to the laterally-projecting and overlapping edges of a can body and cover, the same comprising a carrier for the cans having a progressive movement, movable strip holding members between which the can passes as it is borne by said carrier during the advance movement thereof whereby a strip held by said members in the path of said laterally-projecting and overlapping edges of the can body and cover may become bent around said overlapping edges, and which members by the movement thereof assist in bending and applying said strip to said overlapping edges, a press for pinching said strip onto said overlapping edges after its initial application thereto, and means for operating said carrier, holding and strip applying members and press with a proper relative sequence of operation.

7. A can sealing machine for applying a sealing strip to the laterally-projecting and overlapping edges of a can body and cover, the same comprising a carrier for the cans having a progressive movement, movable strip holding and applying members between which the can passes as it is borne by said carrier during the advance movement thereof whereby the strip held by said members in the path of said laterally-projecting and overlapping edges of the can body and cover may become bent around said overlapping edges, and which members by the movement thereof assist in bending and applying said strip to said overlapping edges, said members providing also an edge against which said strip may bear after the initial application thereof to the can, a press coöperating with said members for pinching said strip onto said overlapping edges after the initial application thereof as aforesaid, and means for operating said carrier, strip holding and applying members and press with a proper relative sequence of operation.

8. A can sealing machine for applying a sealing strip to the laterally-projecting and overlapping edges of a can body and cover, the same comprising a carrier for the cans having a progressive movement, movable strip holding and applying members between which the can passes as it is borne by said carrier during the advance movement thereof whereby a strip held by said members in the path of said laterally-projecting and overlapping edges of the can body and cover may become bent around said overlapping edges, and which members by the movement thereof assist in bending and applying said strip to said overlapping edges, a feeding mechanism for feeding the strips to said strip holding and applying members to lie between the same and the can in the path of said can during the advance movement thereof, and means whereby said feeding mechanism, carrier and strip holding and applying members may operate with a proper relative sequence of operation.

9. A can sealing machine for applying a sealing strip to the laterally-projecting and overlapping edges of a can body and cover, the same comprising a carrier for the cans having a progressive movement, movable strip holding and applying members between which the can passes as it is borne by said carrier during the advance movement thereof whereby a strip held by said members in the path of said laterally-projecting and overlapping edges of the can body and cover may become bent around said overlapping edges, and which members by the movement thereof assist in bending and applying said strip to said overlapping edges, a press for pinching said strip onto said overlapping edges after its initial application thereto, and feed mechanism for feeding the strips to said strip holding and applying members to lie between the same and the can in the path of said can during the advance movement thereof, and means for operating said strip feeding mechanism, carrier and movable strip holding and applying members with a proper relative sequence of operation.

10. A can sealing machine for applying a sealing strip to the laterally-projecting and overlapping edges of a can body and cover, the same comprising a carrier for the cans having a progressive movement with intermittent periods of dwell, movable strip holding and applying members between which the can passes as it is borne by said carrier during the advance movement thereof whereby a strip held by said members in the path of said laterally-projecting and overlapping edges of the can body and cover may become bent around said overlapping edges, and which members by the movement thereof assist in bending and applying said strip to said overlapping edges, a press for pinching said strip onto said overlapping edges after its initial application thereto, a strip feeding mechanism for feeding the strips to lie between said strip holding and applying members and the can, whereby the strip may be applied thereto as aforesaid, means for progressively moving said carrier with intermittent periods of dwell, means for operating said strip feeding mechanism during the dwell of said carrier, means for operating said strip holding and applying members with a movement relative to the movement of said carrier and position of the can borne thereby, and means for operating said press during the dwell of the carrier.

11. A can sealing machine for applying a sealing strip to the laterally-projecting and overlapping edges of a can body and cover, the same comprising a carrier for the cans having a progressive movement with intermittent periods of dwell, movable strip holding and applying members between which the can passes as it is borne by said carrier during the advance movement thereof whereby a strip held by said members in the path of the laterally-projecting and overlapping edges of the can body and cover may become bent around said overlapping edges during the advance movement of the can, and which members by the operation thereof assist in bending and applying said strip to said overlapping edges, a strip forming and feeding mechanism adapted to form the strips and feed the same to said strip holding and applying members to lie between the same and the overlapping edges of the can body and cover whereby the strip may become bent around the can during the advance movement thereof as aforesaid, means for operating said carrier to have a progressive movement with intermittent periods of dwell, means for operating said strip forming and feeding mechanism whereby a strip may be fed to the strip holding and applying members during the dwell of said carrier, and means for operating said strip holding and applying members with a movement relative to that of said carrier and position of the can borne by it.

12. A can sealing machine for applying a sealing strip to the laterally-projecting and overlapping edges of a can body and cover, the same comprising a carrier for the cans having a progressive movement with intermittent periods of dwell, movable strip holding and applying members between which the can passes as it is borne by the carrier during the advance movement thereof whereby a strip held by said members in the path of said laterally-projecting and overlapping edges of the can body and cover may become bent around said overlapping edges, and which members by the operation thereof assist in bending and applying said strip to said overlapping edges, a press for pinching said strip onto said overlapping edges after its initial application thereto, a strip feeding mechanism adapted to feed the strip to lie between said strip holding and applying members and the overlapping edges of the can body and cover whereby the strip may be applied thereto as aforesaid upon the advance movement of the can, means for operating said carrier with a progressive movement and intermittent periods of dwell, means for operating said strip feeding mechanism during the dwell of the carrier, means for simultaneously operating said strip holding and applying members during the advance movement of the carrier and with a movement relative thereto and the movement of the strip holding and applying members being completed during the dwell of said carrier, and means for operating said press during the dwell of said carrier.

13. A can sealing machine for applying a sealing strip to the laterally-projecting and overlapping edges of a can body and cover, the same comprising a carrier for the cans having a progressive movement with intermittent periods of dwell, movable strip holding and applying members between which the can passes as it is borne by said carrier during the advance movement thereof whereby a strip held by said members in the path of said laterally-projecting and overlapping edges of the can body and cover may become bent around said overlapping edges, and which members by the movement thereof assist in bending and applying said strip to said overlapping edges, said members presenting also an edge against which said strip may bear after its initial application to said overlapping edges, a press coöperating with said members for pinching the strip onto said overlapping edges after its initial application thereto as aforesaid, a feed mechanism for feeding a strip to lie between said strip holding and applying members and the overlapping edges of the can body and cover whereby it may be applied to said overlapping edges upon the advance movement of the can, and means for operating said strip feeding mechanism, carrier, strip holding and applying members and press with a proper relative sequence of operation.

14. A can sealing machine for applying a sealing strip to the laterally-projecting and overlapping edges of a can body and cover, the same comprising a carrier for the cans having a progressive movement with intermittent periods of dwell, movable strip holding and applying members between which the can pases as it is borne by the carrier during the advace movement thereof whereby a strip held by said members in the path of said laterally-projecting and overlapping edges of the can body and cover may become bent around said overlapping edges, and which members by the operation thereof assist in bending and applying said strip to said overlapping edges, a primary continuously-operating driving mechanism, and means for operating said carrier from off said primary driving mechanism to have a progressive movement with intermittent periods of dwell and for simultaneously imparting a relative movement to said strip holding and applying members whereby the same may be operated to follow around the overlapping edges of the can body and cover and complete their operation of applying a sealing strip thereto during the dwell of the carrier following an advance movement thereof.

15. A can sealing machine for applying a sealing strip to the laterally-projecting and overlapping edges of a can body and cover, the same comprising a carrier for the cans having a progressive movement with intermittent periods of dwell, movable strip holding and applying members between which the can passes as it is borne by the carrier during the advance movement thereof whereby a strip held by said members in the path of said laterally-projecting and overlapping edges of the can body and cover may become bent around said overlapping edges, and which members by the operation thereof assist in bending and applying said strip to said overlapping edges, a press for pinching said strip onto said overlapping edges after its initial application thereto, a primary continuously-operating driving mechanism, a continuously-operating means for operating said carrier from off said driving mechanism to have a progressive movement with intermittent periods of dwell, a continuously-operating means driven by said primary driving mechanism for imparting movement to said strip holding and applying members relative to that of said carrier and can borne by it.

16. A can sealing machine for applying a sealing strip to the laterally-projecting and overlapping edges of a can body and cover, the same comprising a carrier for the cans having a progressive movement with intermittent periods of dwell, movable strip holding and applying members between which the can passes as it is borne by the carrier during the advance movement thereof whereby a strip held by said members in the path of said laterally-projecting and overlapping edges of the can body and cover may become bent around said overlapping edges, and which members by the operation thereof assist in bending and applying said strip to said overlapping edges, a press for pinching said strip onto said overlapping edges after its initial application thereto, continuously-operating primary driving mechanism, a continuously-operating means whereby said carrier may be progressively moved with intermittent periods of dwell and said strip holding and applying members be operated to have a movement relative to that of said carrier and can borne by it, means whereby said press may be operated from said primary driving mechanism during the dwell of said carrier, and means for feeding said strip during the dwell of said carrier.

17. A can sealing machine for applying a sealing strip to the laterally-projecting and overlapping edges of a can body and cover, the same comprising a carrier having a progressive movement with intermittent periods of dwell, movable strip holding and applying members between which the can passes as it is borne by the carrier during the advance movement thereof whereby the strip held by said members in the path of said laterally-projecting and overlapping edges of the can body and cover may become bent around said overlapping edges, and which members by the operation thereof assist in bending and applying the strip to said edges, a press coöperating with said members for pinching the strip onto said overlapping edges after its initial application thereto, a strip feeding mechanism, a continuously-operating primary driving mechanism, means whereby said carrier may be moved from said primary driving mechanism to have a progressive movement with intermittent periods of dwell, means for coincidently operating said strip holding and applying members to have a movement relative to that of said carrier and can borne by it, means for intermittently operating said press from off said primary driving mechanism during the dwell of said carrier, and means for operating said feeding mechanism during the dwell of said carrier.

18. In a can sealing machine for applying a sealing strip to the laterally-projecting and overlapping edges of a can body and cover, the combination with a table, of a carrier for the cans adapted to pass over said table, movable strip holding and applying members oppositely arranged upon said table and between which the carrier and cans borne by it are adapted to pass, means for operating said carrier, and means for operating said strip holding and applying members.

19. In a can sealing machine for applying a sealing strip to the laterally-projecting and overlapping edges of a can body and cover, the combination with a carrier for the cans, movable strip holding and applying members and press, of a primary driving mechanism, means for operating said carrier from said driving mechanism to have a progressive and intermittent movement, a cam shaft and connecting mechanism for operating said movable strip holding and applying members, a crank shaft for operating said press, means for continuously operating said cam shaft from said primary driving mechanism, and means whereby said crank shaft may be operated from said primary driving mechanism only during the dwell of the carrier.

20. In a can sealing machine for applying a sealing strip to the laterally-projecting and overlapping edges of a can body and cover, the combination with a carrier for the cans, movable strip holding and applying members and a press, of a strip feeding mechanism, a cam shaft and connecting mechanism for operating said movable strip holding and applying members, a crank shaft for operating said press, a primary driving mechanism, means whereby said carrier may be operated from said driving mechanism with a progressive and intermittent movement, means for continuously turning said cam shaft from said primary driving mechanism, means whereby said feeding mechanism may be operated from said cam shaft during the dwell of the carrier, and means whereby said crank shaft may be operated only during the dwell of the carrier.

21. In a can sealing machine for applying a sealing strip to the laterally-projecting and overlapping edges of a can body and cover, the combination with a table, of a carrier for the cans having a progressive and intermittent movement over and around said table, movable strip holding and applying members arranged upon said table, a press coöperating with said members, a feeding mechanism, a primary driving mechanism, means whereby said carrier may be operated from said driving mechanism with a progressive movement having intermittent periods of dwell, means for operating said strip holding and applying members from said driving mechanism, the same comprising in part a cam, means for operating said feeding mechanism from said primary driving mechanism during the dwell of the carrier, and means whereby said press may be operated from said primary driving mechanism during the dwell of the carrier.

22. In a can sealing machine of the type specified, a carrier having a progressive movement with intermittent periods of dwell, movable strip applying and die forming members oppositely arranged and adapted to embrace the can, said members presenting also an edge against which the sealing strip may bear after its initial application to the can, a press member coöperating with said die members to pinch the sealing strip onto the can, and means for operating said movable press member during the dwell of the carrier.

HANS CHRISTIANSEN.
JOHN P. GUPPEY.

Witnesses:
JOHN E. R. HAYES,
M. E. FLAHERTY.

Copies of this patent may be obtained for five cents each, by addressing the "Commissioner of Patents, Washington, D. C."